United States Patent
Boussarov et al.

(10) Patent No.: US 11,436,473 B2
(45) Date of Patent: Sep. 6, 2022

(54) SYSTEM AND METHOD FOR DETECTING ANOMALIES UTILIZING A PLURALITY OF NEURAL NETWORK MODELS

(71) Applicant: Intuit Inc., Mountain View, CA (US)

(72) Inventors: Miroslav S. Boussarov, San Diego, CA (US); Jason Webb, Valley Center, CA (US); Laurent Benchimol, San Diego, CA (US); Gao Pan, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 566 days.

(21) Appl. No.: 16/567,879

(22) Filed: Sep. 11, 2019

(65) Prior Publication Data

US 2021/0073618 A1 Mar. 11, 2021

(51) Int. Cl.
*G06N 3/02* (2006.01)
*G06N 3/04* (2006.01)
*G06F 9/54* (2006.01)
*G06N 3/08* (2006.01)

(52) U.S. Cl.
CPC .............. *G06N 3/0454* (2013.01); *G06F 9/54* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 9,858,124 B1* | 1/2018 | Ghare | .................... | G06F 9/5083 |
| 10,129,118 B1* | 11/2018 | Ghare | .................... | H04L 43/028 |
| 10,375,169 B1* | 8/2019 | Diallo | .................... | G06F 11/301 |
| 10,392,022 B1* | 8/2019 | Rau | ........................ | B60W 40/09 |
| 10,635,565 B2* | 4/2020 | Dang | .................... | G06F 11/3072 |
| 10,713,236 B2* | 7/2020 | Averbuch | ................. | G06F 17/18 |
| 10,972,491 B1* | 4/2021 | Guha | .................... | H04L 63/1425 |
| 11,157,524 B2* | 10/2021 | Zavesky | .................... | G06N 3/08 |
| 11,194,691 B2* | 12/2021 | Dherange | .............. | G06N 7/005 |
| 2019/0182280 A1* | 6/2019 | La Marca | ............... | H04L 43/16 |

* cited by examiner

*Primary Examiner* — Martin Mushambo
(74) *Attorney, Agent, or Firm* — Paradice and Li LLP

(57) ABSTRACT

API gateway log data of HTTP response information is collected and aggregated for each API service. The log data is streamed and formed into a feature vector. A model training module trains a neural network model based on the feature vector and model metadata. The model training module also retrains the neural network model based on a new feature vector. Neural network model artifacts are stored and used to detect anomalous patterns and generate alerts of the detection.

20 Claims, 9 Drawing Sheets

| | |
|---|---|
| 500 | 511 |
| 521 | "modelType": "MLP", |
| 522 | "autoGenerateModel": "true", |
| 523-4 | "newModelGenerateFrequency": "1h" |
| 524-6 | "trainingWindowSize": "10d" |
| 525-9 | "trainingSplitFactor": 0.8, |
| 526-31 | "modelFeatures": [ |
| 527-32 | {<br>  "featureName": "count_2x",<br>  "featureSmoothing": ["int", "log", "sqrt"]<br>}, |
| 528-33 | {<br>  "featureName": "count_4x",<br>  "featureSmoothing": ["int", "log"]<br>}, |
| 529-34 | {<br>  "featureName": "count_5x",<br>  "featureSmoothing": ["int", "log"]<br>}, |
| 530-5 | {<br>  "featureName": "iqr_svcTime",<br>  "featureSmoothing": ["int", "log"]<br>} ] |

FIG. 5

| 600 | 611 |
|---|---|
| 621 | "svcAlias": "biz.CTO.auth", |
| 622 | "time": "2018-04-23T18:53:00-07:00", |
| 623 | "count_2x": "24393", |
| 624 | "count_3x": "0", |
| 625 | "count_4x": "326", |
| 626 | "count_401": "15", |
| 627 | "count_403": "0", |

FIG. 6

SYSTEM AND METHOD FOR DETECTING ANOMALIES UTILIZING A PLURALITY OF NEURAL NETWORK MODELS

BACKGROUND

The worldwide web is made up of a network of many remote servers that are interconnected with each other. A remote server is a remotely located computer that is designed to serve webpages based on requests from users for those webpages. For example, when a user types a website address into an internet browser, a request goes out to a remote server that is hosting the website and the remote server delivers a response. The response is delivered as software code in an industry-accepted format that the browser interprets to display a webpage to the user. Such an industry-accepted format is typically hypertext markup language (HTML).

A remote server receives requests and sends responses through an application program interface, which is commonly known as an API. In addition to providing an interface to a user's internet browser, an API allows for remote servers to send and receive requests from each other. For example, a remote server that hosts a weather webpage may receive its weather information from a government weather agency's remote server that hosts satellite data information. Such receipt of government weather information is through an initial request for the weather information from one remote server followed by a response to the request from another remote server. In this example, the response would typically be the requested weather information, but it may also be an error message. For example, an error message may need to be delivered due to an inability for the receiving remote server to provide the requested information. An error message is typically delivered in a format that is coded in an industry-accepted format, such as hypertext transfer protocol (HTTP).

When a remote server is providing services to another remote server, that other remote server is consuming those services. A consumer and a service send each other requests and responses through an API. A software application may have many different services and many different consumers of the services. For example, software engineers typically divide their applications into many parts residing on many different remote servers, and all these parts are interconnected with each other through APIs. These application parts are consumers and services in relation to each other.

There can be many consumers and services within an operational environment. Accordingly, requests and responses between consumers and services can be routed through a gateway. With a gateway, rather than a consumer sending a request directly to a service, the consumer sends the request to the gateway and the gateway routes the request to an applicable service. Similarly, rather than a service sending a response directly to a consumer, the service sends the response to the gateway and the gateway routes the response to the applicable consumer. Such routing by a gateway helps manage internet traffic on the worldwide web.

Gateways provide an intermediary between a service and a consumer, such as a device, an application, or a website. One of the roles of a gateway is to make the service available to the consumer. A gateway makes a service available by exposing the APIs of a service to the consumers. An API of a service is exposed through an endpoint that provides an entry to the API for the consumer. A gateway exposes each endpoint on behalf of a service, and thus the gateway acts as a proxy for the service, in which the gateway acts on behalf of the service. A gateway, or a grouping of gateways, provides many endpoints to consumers, which can be thought of as a façade of many endpoints, in which the gateway creates an appearance for the consumers that the consumers are interacting directly with the service. A gateway's façade of services enables the gateway to receive requests from a consumer for an exposed API, route requests to an appropriate service, and route responses to the appropriate consumer.

One type of response to a consumer is an error message. With a typical gateway architecture with services and consumers, a team of engineers monitor the error messages and resolve problems as they arise. However, when there is a large number of services generating error messages, the effort of an engineering team to manage the corresponding large number of error messages becomes unmanageable and beyond the capabilities of the human mind. This results in problems with a service being unresolved for a potentially long period of time. Anomaly detection with a complex gateway architecture typically overwhelms a team of engineers. For example, there may be over hundreds of millions of service requests per day that an engineering team must monitor.

Consequently, there is a significant need for a technical solution to the long-standing technical problem of detecting patterns of anomalies of data management systems utilizing gateway architectures.

SUMMARY

As discussed in more detail below, embodiments of the present disclosure represent the technical solution to the technical problem of anomaly detection of data management systems utilizing gateway architectures. The technical solution to the technical problem of anomaly detection includes a plurality of neural networks. A neural network typically represents an attempt to replicate the function of the human brain, such as with layers of artificial neurons. Traditionally, a single neural network is utilized for deep learning. Such a deep learning neural network is considered beneficial because it can process relatively large amounts of data. Traditionally, an artificial neural network is considered deep because of the layers that exist in such networks that allow for training with backpropagation. While such backpropagation of the layers of a deep neural network is beneficial for the deep neural network to be able to process large quantities of data, it correspondingly takes a long amount of time and increased usage of processing power to train a deep neural network. Furthermore, if a relatively small amount of additional training data is received, the time and processing power to retrain a deep neural network with backpropagation remains relatively large.

In contrast, the present disclosure includes many relatively small neural networks that can be trained and retrained relatively quickly. A large amount of data is received from a plurality of services and then streamed to the small neural networks. Each neural network is associated with one of the services through a key that associates a portion of the streaming data to a relatively small neural network. Neural network model metadata associated with the key is utilized to determine the features to extract from the streamed data in order to train one of the neural networks in a relatively shorter amount of time.

Streaming data is streamed to a plurality of neural network modules in parallel. For example, streaming data is streamed in parallel to a model trainer module, which trains and retrains models, and to an anomaly detector module, which detects anomalies in the streaming data. A first portion of the streaming data is streamed to the model trainer module that determines whether a model should be retrained, and if so, an applicable relatively small model is retrained. At generally the same time, the first portion of the streaming data is also streamed to the anomaly detector module that determines whether there is an anomaly within the first portion of the streaming data based on processing by an applicable model. Accordingly, relatively real-time training and processing of streaming data occurs relatively in parallel.

Streaming data includes key data that is used to associate portions of the streaming data with a corresponding neural network model and with corresponding model metadata. Key data represents one or more fields that identify a portion of the streaming data. A key is a representation of a unique identifier of a service that is responding to consumers. For example, a consumer makes a request to a service via a gateway, and the service responds to the request. In this example, each response is logged by the gateway and used to generate aggregated service data that is associated with a key representing the respective service. One or more models are generated that are associated with respective keys of the streaming data. Model metadata that is associated with a respective key of the streaming data defines how associated models are to be trained and how the respective streaming data is to be pre-processed prior to training the model and prior to using the model to detect anomalies. Based on the key data and the associated model metadata, a respective model associated with the key data can be selected to detect an anomaly within the respective portion of the streaming data that is associated with the key data.

The responses of the services include coded messages that can be aggregated, in which each code is a numeric value. A trained model that represents a relatively small neural network is utilized to detect anomalies from the coded messages of the services. After a neural network model detects an anomaly, a notification is delivered to an engineer, such as an engineer who is responsible for the particular service. Upon receipt of the notification of an anomaly, the engineer proceeds to troubleshoot the service.

BRIEF DESCRIPTION OF THE DRAWINGS

FIG. 5 is an example table of model metadata for anomaly detection.

FIG. 6 is an example table of features for anomaly detection.

Figure 1:
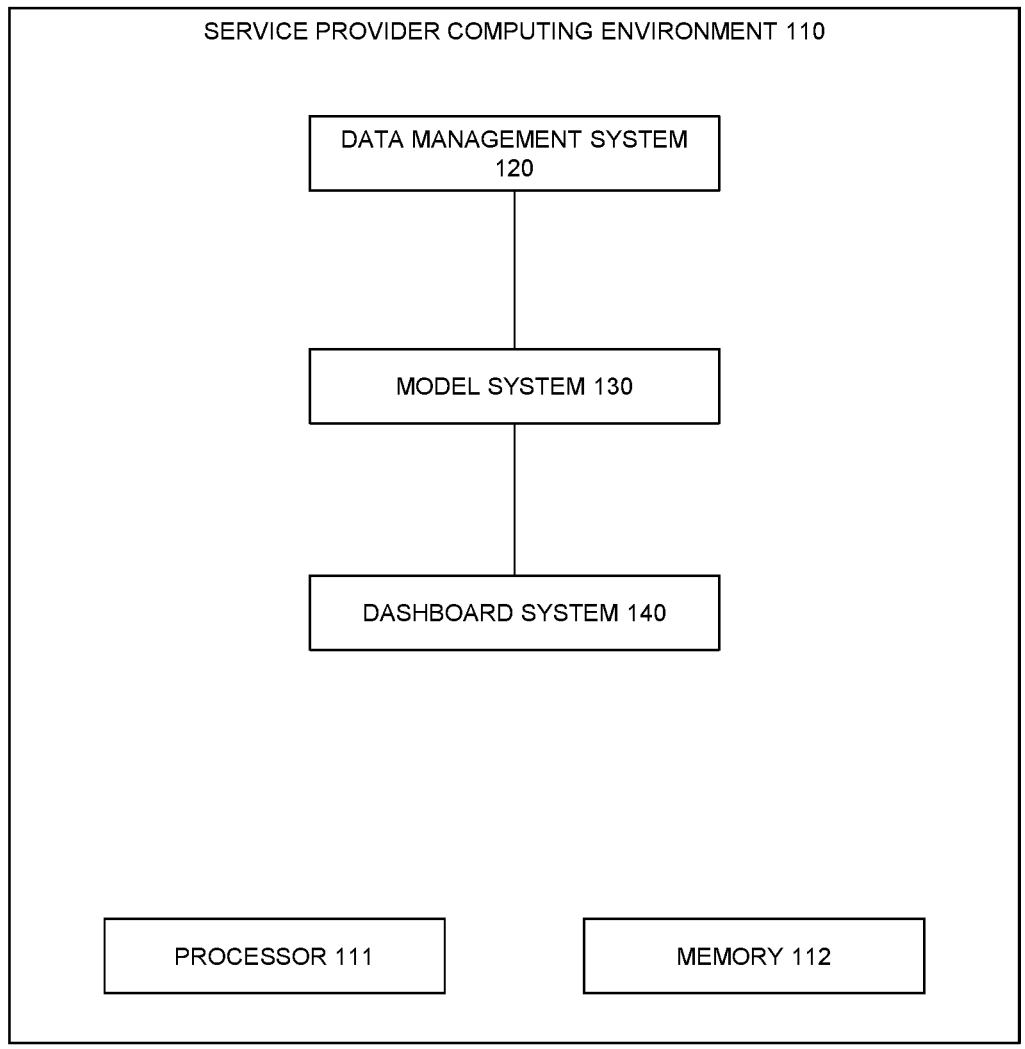
FIG. 1 is a functional block diagram of a production environment for anomaly detection.

Common reference numerals are used throughout the figures and the detailed description to indicate like elements. One skilled in the art will readily recognize that the above figures are examples and that other architectures, modes of operation, orders of operation, elements, and functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Overview

Embodiments of the present disclosure provide a technical solution to the technical problem of anomaly detection of data management systems utilizing API gateway architectures. The disclosed technical solution includes meta-data driven streaming of data, parallel streaming of data, and actors model processing of data.

As discussed in more detail below, embodiments of the present disclosure represent the technical solution to the technical problem of anomaly detection of data management systems utilizing API gateway architectures. The technical solution to the technical problem of anomaly detection includes generating a notification that an anomalous pattern of metrics has been detected based on metrics of responses to API requests managed by an API gateway. Detections are based on the determination of threshold values by neural network models that are periodically retrained with recent data, such that threshold values do not become obsolete and detections of anomalies improve over time.

Neural networks are utilized to learn complicated patterns of responses to API requests. A plurality of small neural networks is trained and retrained to recognize such complicated patterns. For example, there may be hundreds or thousands of small neural networks that can process multiple data streams in parallel and predict, categorize, and detect patterns in relative real-time. The training and usage of the small neural networks is performed in parallel, such that any one model is consistently recent, relevant, trained, and evaluated with the latest data.

The technical solution to the technical problem of detecting patterns of anomalies of data management systems utilizing API gateway architectures includes generating an alert that a pattern of responses has been detected that differs from past patterns of responses. Metrics about each service is collected by an API gateway and anomalies about one of the services is detected based on those metrics. A neural network model is trained to determine a threshold value based on historical patterns of metrics. A metric threshold is calculated using the neural network model that is retrained at periodic intervals, such as every eight hours. An anomaly score is calculated based on a stream of metrics received on a relative real-time basis. An anomaly score triggers an alert when it exceeds a predetermined threshold value. An anomaly score may be based on request metrics such as the volume of response status codes received, the response time to a response, and other response metrics.

A feature vector of metrics for each service is generated and used to train a neural network model. A feature vector includes features of aggregated counts of various API status codes, aggregated counts of various response times categorized by percentiles, and other aggregated counts. For example, there may be over six hundred services associated with respective feature vectors that are processed periodically, such as every minute. Historical feature vectors are utilized to train a neural network model based on normal patterns of metrics. After such training, real-time feature vectors are utilized by the neural network model to determine anomalous patterns. The neural network model determines a threshold value based on the historical feature vectors, and an alert is generated when a metric of real-time feature vectors exceeds a threshold value.

FIG. 1 is a functional block diagram of a production environment 100 for anomaly detection. It is to be understood that the diagram of FIG. 1 is for exemplary purposes and is not meant to be limiting. The production environment 100 includes a service provider computing environment 110 comprising a data management system 120 discussed further below with respect to FIG. 2, a model system 130 discussed further below with respect to FIG. 3, and a dashboard system 140 discussed further below with respect to FIG. 4. An anomaly is an unusual pattern that has appeared in received metrics that has not been observed in normal patterns in the past.

The production environment 100 includes a processor 111 and a memory 112. The memory 112 includes instructions stored therein and which, when executed by the processor 111, performs a process. The production environment 100 includes instructions representing processes of the data management system 120, the model system 130, and the dashboard system 140.

The data management system 120 provides aggregated service data to the model system 130. Such aggregated service data provides statistical data related to services provided by the data management system 120. For example, the aggregated service data may include metrics of response times, counts of errors, percentages of errors, aggregated loads, and other metrics. Aggregated service data represents data received from a respective service of a plurality of services. New aggregated service data for a service can be added based on an additional metric. For example, an additional metric may be a service metric such as central processing unit (CPU) usage, memory usage, and other service metrics. It is to be understood that new aggregated service data can be included that represents a desirable metric related to one or more services.

The data management system 120 is configured to provide data management services to a plurality of users. The data management system 120 is an electronic financial accounting system that assists users in bookkeeping or other financial accounting practices. Additionally, or alternatively, the data management system 120 can manage one or more of banking, investments, loans, credit cards, real estate investments, retirement planning, bill pay, budgeting, regulation compliance and any other data management system. The data management system 120 can be a standalone system that provides data management services to users. Alternatively, the data management system 120 can be integrated into other software or service products provided by a service provider.

The model system 130 receives aggregated service data from the data management system 120 and generates data streams from the aggregated service data. The data streams are stored in a historical data stream storage. The historical data stream storage comprises compressed data stream data. Such compression enhances quick retrieval of historic data stream data. For example, the historical data stream storage comprises web-scale computing storage and other scalable storage infrastructures. It is to be understood that the amount of data stream data that is stored historically may be associated with any period of time such as a week, ten days, a month, a quarter, a year, and other periods of time.

The model system 130 includes a model trainer module. The model trainer module receives streaming data representing data from multiple services of the data management system 120. The model trainer module receives historical streaming data from the historical data stream storage. The model system 130 includes metadata configuration that defines how models are to be trained, as described further below. Trained models are stored in a serialized format, such as a compressed format, that can be retrieved in a deserialized format, such as in a string format. The model trainer module examines the received streaming data and determines that a model is to be retrained based on the received streaming data, as described further below. Streaming data is a series of published aggregated service records streamed in relative real-time.

The model system 130 is an adaptive system that continuously trains models based on receiving streaming data and model training frequency configuration. Models are continuously evolving and learning new patterns based on received streaming data. A plurality of trained neural network models is utilized to detect anomalies of a data stream representing multiple entities, such as services, applications, servers, and other entities. For example, the number of trained neural network models may be in the hundreds, the thousands, and other numbers.

The model system 130 includes an anomaly detector module. The anomaly detector module reads and caches the streaming data received in relative real-time. The anomaly detector module selects and loads an appropriate model based on key data and processes the received streaming data with the selected model, as discussed further below with respect to FIG. 3. The anomaly detector module of the model system 130 generates a notification when an anomaly is detected. The notification is delivered to the dashboard system 140. The dashboard system 140 includes an analytics module that displays the notification to an engineer via a dashboard module. A notification is incorporated into dashboard information of the dashboard system 140. Such notifications are generated based on parallel, uninterrupted, and autonomous training and processing, as described further below.

Exemplary Environment

The technical solution to the technical problem of anomaly detection of data management systems utilizing API gateway architectures includes training a plurality of neural network models in parallel and detecting anomalies by utilizing the plurality of neural networks in parallel to process multiple data streams. It is to be understood that utilizing the plurality of neural network models includes detecting anomalies, making predictions, and other neural network processing. In this way, it is possible to train and retrain many small neural network models that can process multiple data streams in parallel and predict, categorize, and detect certain patterns in relative real-time. It is to be understood that the technical solution, provides a system that allows for rapidly adding, modifying, and retiring neural network models using streamed data.

In a typical API gateway architecture, a plurality of API consumers is communicatively coupled to a set of API gateways in order to consume API services. The set of API gateways provide a facade for groupings of a plurality of API services, and each of the API services comprise at least one API. Each API gateway provides multitenant capabilities for groupings of API services. Such multitenant capabilities include load balancing strategies to route requests to one of a plurality API services.

In a typical API gateway architecture, an API gateway receives hypertext transfer protocol (HTTP) requests from API consumers. HTTP typically enables communication between an API service and an API consumer utilizing a request-response protocol. For example, an API consumer may send an HTTP request to an API service, and the API service returns to the API consumer a response that may contain status information about the request as well as the requested content. With this example, an HTTP request may be an authentication request, and an API gateway may collect such a request and deliver it to the appropriate server that provides a response to the request.

In a typical API gateway architecture, the API gateway collects log entry data about each HTTP response. For example, a log entry may be whether an HTTP request was successful or failed. Traditionally, a status of a response is represented as a numeric code, such as 200—okay, 300—multiple choice, 400—bad request, 500—internal server error, and other HTTP status response codes. Furthermore, a log entry traditionally includes a response time in milliseconds from an API service based on the routing of the request with the API gateway. Traditionally, log entries are collected in a logging system for an engineer to analyze.

Figure 2:
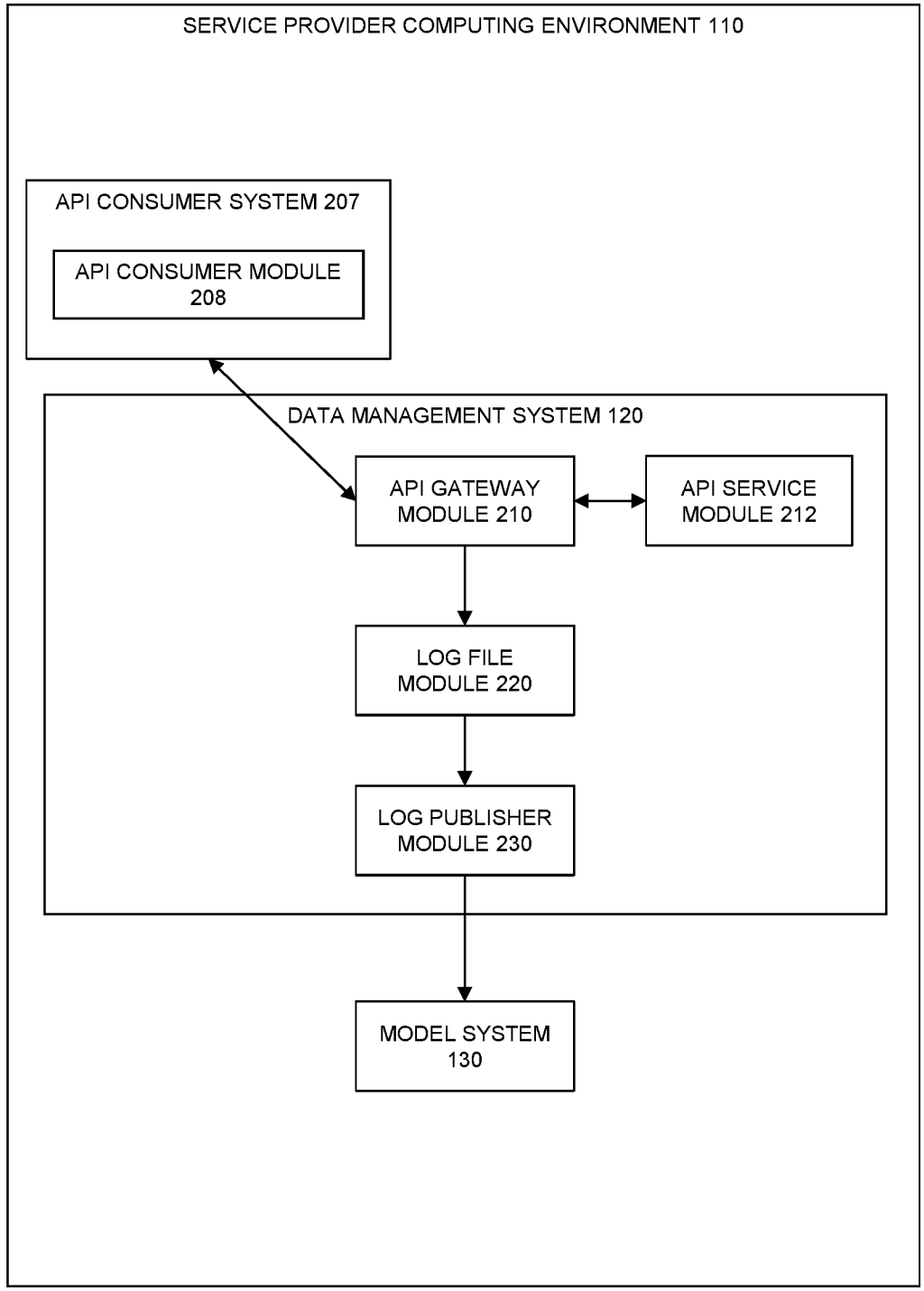
FIG. 2 is a functional block diagram of a data management system for anomaly detection.

FIG. 2 is a functional block diagram of a data management system 120. It is to be understood that the diagram of FIG. 2 is for exemplary purposes and is not meant to be limiting. Referring to FIGS. 1 and 2 together, the production environment 100 includes a service provider computing environment 110, which includes a data management system 120, a model system 130, and an API consumer system 207. The data management system 120 includes an API gateway module 210 that interfaces with the API consumer systems 207, an API service module 212, a log file module 220, and a log publisher module 230 that interfaces with the model system 130.

The service provider computing environment 110 represents one or more computing systems, such as one or more servers and/or distribution centers, that are configured to receive, execute, and host one or more API service systems for access by one or more consumers of services. Furthermore, the service provider computing environment 110 represents one or more computing systems that are configured to receive, execute, and host one or more data management systems (e.g., applications) for access by one or more users. The service provider computing environment 110 can be a traditional data center computing environment, a virtual asset computing environment (e.g., a cloud computing environment), or a hybrid between a traditional data center computing environment and a virtual asset computing environment.

The API service module 212 comprises a plurality of APIs that provide respective services. There are a plurality of API service modules 212, and each API service module 212 comprises a plurality of APIs. Each API service module 212 may comprise the same plurality of APIs, some of the same plurality of APIs, and/or different pluralities of APIs. Two or more APIs of the API service module 212 provide services that are related to the data management system 120. Such two or more APIs of the API service module 212 form one or more groupings of APIs. Although a single API service module 212 is depicted as residing within the data management system 120, it is to be understood that any number of API service modules 212 may reside in any number of data management systems 120 or in any number of API service systems (not depicted). For example, an application that provides financial management services may include fifty API services that are exposed to API consumers. It is to be understood that the service provider computing environment 110 may include any number of applications (not shown) each including any number of respective API services of the API service module 212. Each API of the API service module 212 comprises an endpoint that provides an entry to the API for an API consumer.

One or more API gateway modules 210 expose each API endpoint of the API service module 212 by being a proxy for the respective API, thereby creating a facade of endpoints for an API consumer to consume the service offered by each API. Although the API gateway module 210 is depicted as residing in the data management system 120, it is to be understood that any number of API gateway modules 210 may reside in any number of data management systems 120 or in any number of API service systems (not depicted). Furthermore, any number of API gateway modules 210 may serve as a facade for any number of API service modules 212 residing in any number of data management systems 120 communicatively coupled with communication channels.

The API gateway module 210 provides a facade of API services of the API service module 212, and the facade enables the API gateway module 210 to receive requests from the API consumer systems 207 for an exposed API of the API service module 212, to route requests to an appropriate API of the API service module 212, to route API responses from the appropriate API of the API service module 212, to enforce security of each request, to perform traffic manipulation such as performing rate limiting on calls to an API of the API service module 212, and to perform other API gateway policies.

An API consumer, such as a device or application, consumes API services of the API service module 212. The service provider computing environment 110 includes an API consumer system 207. It is to be understood that any number of API consumer systems 207 may be included for any number of API consumers. The API consumer system 207 includes an API consumer module 208. It is to be understood that while only one API consumer module 208 is depicted, any number of API consumer modules 208 may be included in any number of API consumer systems 207.

An API consumer module 208 consumes an API service of the API service module 212 via an API gateway module 210. The API consumer module 208 transmits a request to the API gateway module 210 utilizing a proxy endpoint of an API, and the API gateway module 210 transmits the request to the API service module 212. The API service module 212 transmits a response to the API gateway module 210, which further transmits the response back to the API consumer module 208.

The API gateway module 210 generates log entries that are delivered to the log file module 220. The log file module 220 receives the log entries that monitors and tracks the log entries. The log file module 220 aggregates the collected log entries as aggregated service data.

The log publisher module 230 retrieves the aggregated service data and publishes the aggregated service data to the model system 130. The log publisher module 230 acts under a pull-model by periodically querying the log entry data of the log file module 220. For example, the log publisher module 230 may periodically query the log file module 220 every minute.

Figure 3:
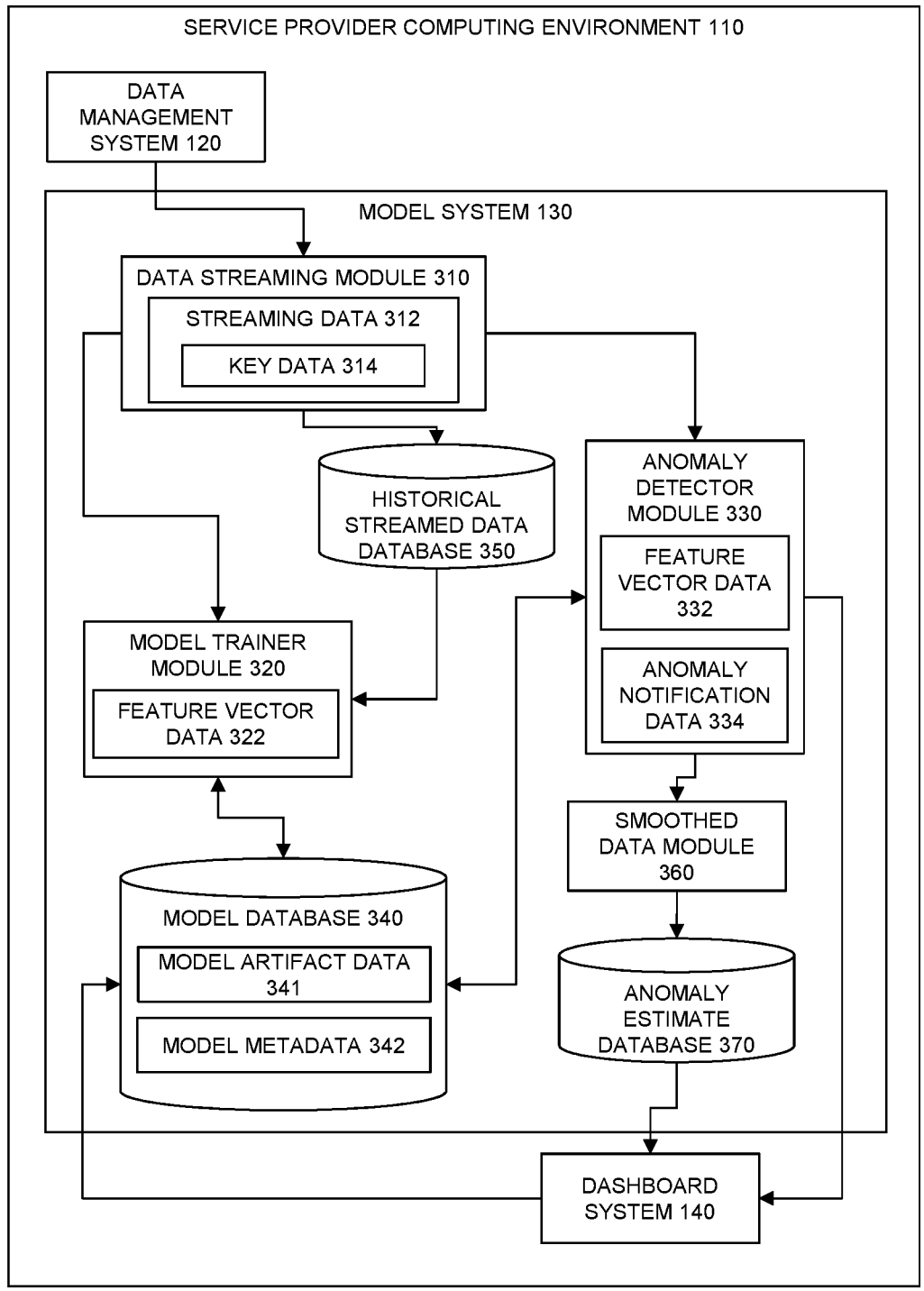
FIG. 3 is a functional block diagram of a model system for anomaly detection.

FIG. 3 is a functional block diagram of a model system 130 for anomaly detection. It is to be understood that the diagram of FIG. 3 is for exemplary purposes and is not meant to be limiting. Referring to FIGS. 1, 2, and 3 together, the production environment 100 includes a service provider computing environment 110, which includes a model system 130, a data management system 120 such as that of FIG. 2, and a dashboard system 140. The model system 130 includes a data streaming module 310 that interfaces with the data management system 120, a model trainer module 320, a historical streamed data database 350, an anomaly detector module 330 that interfaces with the dashboard system 140, a model database 340, a smoothed data module 360, and an anomaly estimate database 370.

The data streaming module 310 receives aggregated service data from the data management system 120 from which streaming data 312 is generated. The streaming data 312 is associated with key data 314. The data streaming module 310 receives aggregated service data and streams such data to the model trainer module 320. The data streaming module 310 receives aggregated service data and streams such data to the anomaly detector module 330. For example, the data streaming module 310 may produce data streams for each service at a rate of every minute. The data delivered by the data streaming module 310 is aggregated service data from the data management system 120. The aggregated service data comprises a plurality of metrics related to a service. The data streaming module 310 is a transport for the streaming data 312. The data streaming module 310 delivers the streaming data 312 to one or more destinations, such as the model trainer module 320 and the anomaly detector module 330.

The model trainer module 320 trains neural network models of the model system 130 based on the streaming data 312 received from the data streaming module 310. The streaming data 312 from the data streaming module 310 is used for model training. The streaming data 312 is used to educate a neural network model to learn a past pattern of the streaming data 312. The streaming data 312 is utilized to generate feature vector data 322 to train a model, as discussed further below with respect to FIGS. 5 and 6. After a model is learned, the model is associated with the applicable service of the streaming data 312, and the model is stored in the model database 340, which is a persistent storage for model artifact data 341 and model metadata 342. A model of a neural network is trained for each service, resulting in many small models. The training is based on the model metadata 342 that describes how streaming data 312 is to be utilized as feature vector data 322 that has been normalized. For example, a neural network model may be trained in under three seconds based on one or more feature vectors representing a time period, such as ten days, of streaming data 312 received about a service. For example, the feature vector data 322 may represent ten thousand feature vectors that the model trainer module 320 utilizes to train or retrain a single neural network model.

A neural network model is trained to recognize normal patterns of streaming data 312 so that the model can be used later for anomaly detection to detect abnormal patterns of streaming data 312. The feature vector data 322 represents a plurality of feature vectors that are used as input to a neural network model for training. For example, the plurality of feature vectors may represent data from a time period such as the prior ten days. As a further example, the plurality of feature vectors may be derived from the streaming data 312, from the historical streamed data of the historical streamed data database 350, or from a combination of the streaming data 312 and the historical streamed data.

The neural network model is trained to generate an output feature vector that matches the input feature vectors. Prior to training, the neurons of the neural network model are initialized with random parameters. With each input of a feature vector, the parameters are adjusted so that the output feature vector becomes similar to the input feature vector. It is to be understood that with traditional neural network training, the output feature vector will not be exactly equal to the input feature vector, but that the tuning of numeric parameters of neurons through training achieves a relative similarity between the output feature vector and the input feature vector. The neural network architecture and the corresponding adjusted parameters are utilized to generate the model artifact data 341.

The model metadata 342 describes how streaming data 312 is to be processed. The model metadata 342 describes the behavior that is needed in order to train a neural network model and storing the resulting neural network model as model artifact data 341. After the model trainer module 320 utilizes the model metadata 342 to generate the model artifact data 341 based on the streaming data 312 from the data streaming module 310, then the anomaly detector module 330 can utilize the model artifact data 341 and the model metadata 342 to detect anomalies.

The model trainer module 320 analyzes the streaming data 312 for a particular service and then determines whether a neural network model is to be trained or retrained based on instructions from the applicable model metadata 342. A model trigger module (not shown) receives the streaming data 312 and determines whether or not the received streaming data 312 triggers the training or retraining of a particular neural network model by the model trainer module 320. Although not shown in FIG. 3, a model trigger module may be incorporated into the model trainer module 320, while alternatively, a model trigger module may be a standalone module that interfaces with the model trainer module 320. A model trigger module is listening to the streaming data 312 in order to make a determination whether a particular neural network model is to be trained or retrained.

For example, if a service is new, then the model trigger module may determine that a new neural network model is to be trained. Alternatively, if an existing neural network model is older than a time period, such as eight hours, then the model trigger module may determine that the existing neural network model is to be retrained. For another example, if an existing neural network model has recently been trained or retrained, then the model trigger module may determine that the existing neural network model does not need to be retrained. It is to be understood that the receipt of streaming data 312 does not necessarily cause a neural network model to be retrained until after a determination is made whether a corresponding neural network model should be retrained. Such a determination is based on information in the applicable model metadata 342, as discussed further below with respect to FIG. 5.

If a neural network model is to be trained or retrained, the model trainer module 320 analyzes the streaming data 312 for a particular service and then determines instructions from the applicable model metadata 342 to generate feature vector data 322. The applicable model metadata 342 provides instructions as to which portion of the streaming data 312 is to be used to train a model, as discussed further below with respect to FIG. 5. A window of sequential records of streaming data 312 is bundled together to form a two-dimensional vector. Such a two-dimensional vector is converted to a one-dimensional vector and used to train a model. The model metadata 342 defines the minimum amount of streaming data 312 needed to train the model, as discussed further below with respect to FIG. 5. The model trainer module 320 stores the model artifact data 341 in the model database 340 for use by the anomaly detector module 330.

The anomaly detector module 330 receives streaming data 312 from the data streaming module 310. Streaming data 312 is received periodically, such as every minute. The anomaly detector module 330 determines the key data 314, such as from a service identifier field, that a data stream is associated with and selects an applicable trained model stored in the model database 340. After an applicable model is selected, the respective streaming data 312 is applied to the model based on the applicable model metadata 342. The anomaly detector module 330 determines the key data 314, such as a service, associated with the streaming data 312 and selects the trained model artifact data 341 and the associated model metadata 342 in the model database 340 based on the determined key data 314. The anomaly detector module 330 determines an appropriate grouping of the streaming data 312 based on the selected model metadata 342 in order to preprocess the streaming data 312 as feature vector data 332. The streaming data 312 is preprocessed by grouping the streaming data 312 into feature vector data 332 based on features defined in the model metadata 342 and based on sliding time-period windows of data defined in the model metadata 342. The feature vector data 332 is processed through the model represented by the selected model artifact data 341.

The results of the application of the respective streaming data 312 to the selected trained model are delivered to the dashboard system 140 as anomaly notification data 334. The anomaly detector module 330 utilizes the model artifact data 341 representing a trained neural network model to determine a threshold value. The anomaly detector module 330 utilizes the model artifact data 341 representing a trained neural network model to determine an anomaly score in relation to the threshold value. The anomaly detector module 330 generates anomaly notification data 334 based on such an anomaly score. It is to be understood that the training of the models and the utilization of the models is occurring in relative real-time for all of the services of the data management system 120 as aggregated service data arrives to the model system 130.

Subscribers to the data streaming module 310 receive the streaming data 312 in relative real-time. The data streaming module 310 stores the streaming data 312 for a short period of time, such as one day, to allow subscribers to retrieve streaming data 312 that had been available earlier in relative real-time. When the data streaming module 310 receives data from the log publisher module 230 of the data management system 120, the data streaming module 310 makes such data available in relative real-time. Such relative real-time delivery may be considered advantageous in order for the anomaly detector module 330 to detect anomalies as quickly as possible, such as in a few seconds.

The historical streamed data database 350 receives streaming data 312 from the data streaming module 310 and persistently stores the streaming data 312. The model trainer module 320 utilizes the stored data of the historical streamed data database 350 to train a model. When training a model, the model trainer module 320 looks back on a certain period of time to determine the past pattern for a particular metric. For example, the model trainer module 320 may look back for a period of time of ten days, twenty days, thirty days, and other periods of time. The historical streamed data database 350 provides for long-term storage of historical metric data for use by the model trainer module 320.

The model trainer module 320 receives streaming data 312 from the data streaming module 310 and periodically retrains a respective model based on the received streaming data 312. The model trainer module 320 determines when a model is to be retrained or is to be trained for the first time. The model trainer module 320 determines whether training is appropriate based on the receipt of the streaming data 312. If training is determined to be appropriate, historical data for a historical time period is retrieved from the historical streamed data database 350. The model trainer module 320 trains or retrains the model based on the streaming data 312 and the historical data stored in the historical streamed data database 350. The model trainer module 320 stores the trained model in the model database 340, for use by the anomaly detector module 330. The model database 340 stores model metadata, as discussed further below with respect to FIG. 5.

The smoothed data module 360 receives streaming data 312 from the anomaly detector module 330 and stores such data in the anomaly estimate database 370. The smoothed data module 360 receives threshold values from the anomaly detector module 330 and stores the threshold values in the anomaly estimate database 370. The smoothed data module 360 receives anomaly scores from the anomaly detector module 330 and stores the anomaly scores in the anomaly estimate database 370. It is to be understood that streaming data, threshold values, and anomaly scores are stored in the anomaly estimate database 370 in order for an engineer to be able to review historical uses of a model and to provide an opportunity for improvements to a model. An engineer reviews the data of the anomaly estimate database 370 via the dashboard system 140 and, based on that review, improves a characteristic of the model via model metadata 342. The anomaly estimate database 370 can be utilized to ascertain historical estimates.

Figure 4:
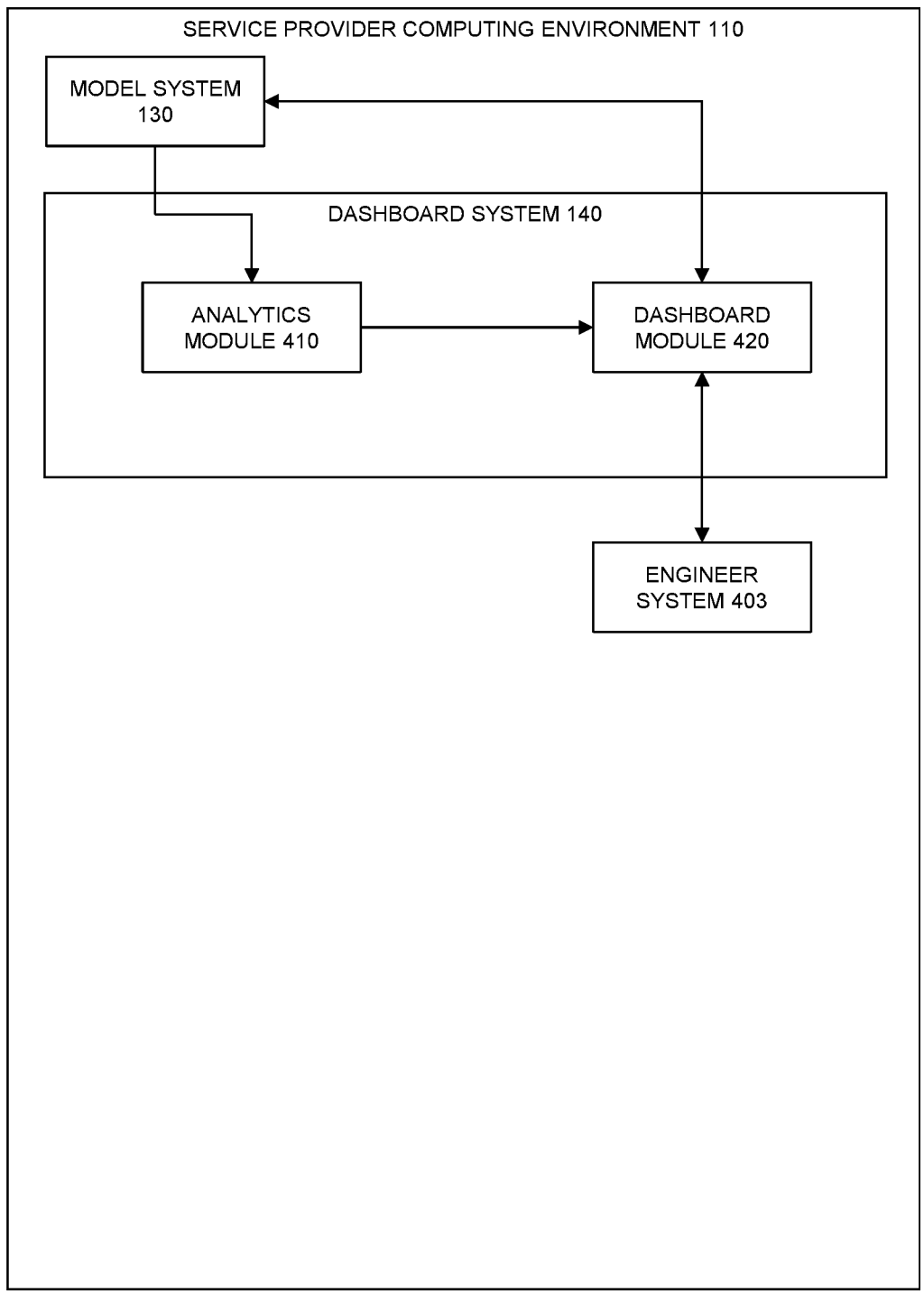
FIG. 4 is a functional block diagram of a dashboard system for anomaly detection.

FIG. 4 is a functional block diagram of a dashboard system 140 for anomaly detection. It is to be understood that the diagram of FIG. 4 is for exemplary purposes and is not meant to be limiting. Referring to FIGS. 1, 2, 3, and 4 together, the production environment 100 includes a service provider computing environment 110, which includes a dashboard system 140, a model system 130, and an engineer system 403. The dashboard system 140 includes an analytics module 410 and a dashboard module 420. At least one engineer utilizes an engineer system 403 to interface with the dashboard module 420. It is to be understood that while only one engineer system 403 is depicted, there can be any number of engineer systems 403 included in any number of service provider computing environments 110.

An engineer subscribes to alerts of anomalies through the dashboard module 420. For example, such an alert may be a notification that something is wrong with a particular API service. The technical solution includes monitoring different domains of services, in which each domain represents a grouping of services. For example, there may be over six hundred services grouped into respective domains representing business units of an organization that provide data management services such as business financial management services, personal financial management services, tax management services, identity management services, and other data management services. Notifications of alerts of anomalies are delivered to the dashboard module 420, from where an engineer can view the alerts via the engineer system 403. The dashboard module 420 interfaces with the data management system 120 and allows for troubleshooting of an API service of the API service module 212 via the engineer system 403.

The dashboard module 420 of the dashboard system 140 is utilized by an engineer to modify the metadata of a model stored in the model database 340. For example, the engineer may define in the model metadata 342 that a model is not to be retrained in the future. As another example, the engineer may define which metrics are to be examined within a feature vector, such as metrics about 500 series response messages. An engineer sets one or more metrics as primary metrics, and the other metrics are secondary, enabling parallel neural network models to process the same stream of data but trained based on different metrics. For example, metrics about 500 series response messages may be set as primary and utilized for training and anomaly detection, while 400 response messages may be secondary and ignored for training and anomaly detection purposes. The metadata of the model database 340 is modified by instructions from the dashboard module 420.

The analytics module 410 monitors the anomaly notification data 334 received from the anomaly detector module 330. The analytics module 410 associates the anomaly notification data 334 with the applicable service of the API service module 212. The analytics performed by the analytics module 410 is provided to the dashboard module 420. For example, such analytics are displayed in graphical format by the dashboard module 420.

Exemplary Process

FIG. 5 is an example table 500 of model metadata for anomaly detection. It is to be understood that the table 500 of FIG. 5 is for exemplary purposes and is not meant to be limiting. Referring to FIGS. 1, 2, 3, 4, and 5 together, column 511 represents characteristics of exemplary model metadata that includes fifteen rows of metadata characteristics. The model metadata is used by the model trainer module 320 to train one or more models. The model metadata is used by the anomaly detector module 330 to detect anomalies. The model metadata drives the behaviors of the model trainer module 320 and the anomaly detector module 330 with respect to processing data of each service of the API service module 212. The model metadata defines which features are used for model training and anomaly detecting. The model metadata defines how to preprocess data through scaling such as logarithmic functions and square root functions to make the different types of data compatible with each other.

The model artifact data 341 represents machine learning models that is generated by the model trainer module 320. Each machine learning model is characterized by a model type, and each model type is defined in the model metadata 342. Row 521 includes the characteristic of "modelType" representing a model type. In this example for row 521, the characteristic is set to "MLP" representing a multilayer perceptron neural network. A model type may be a multilayer perceptron neural network (MLP), a recurrent neural network (RNN), long short-term memory RNN neural network (LSTM), convolutional neural network (CNN), and other model types. The model type may include a description of a neural network architecture, such as neurons and layers, configuration templates, regularization parameters, hyperparameters, and other neural network architecture descriptions.

The model trainer module 320 can automatically generate the model artifact data 341 based on the receipt of the streaming data 312. Alternatively, the model trainer module 320 can receive a command to generate the model artifact data 341. Such command based model generation can be advantageous when an administrator wants to reset a model immediately without having to wait for the streaming data 312 to arrive. Row 522 includes the characteristic of "autoGenerateModel" representing an instruction whether a model is to be generated automatically, such as every eighth hour. In this example for row 522, the characteristic is set to "true" representing a true condition. On the other hand, if the characteristic is set to false, then the model is to be generated by a command instruction.

The model trainer module 320 is configured to generate a new model artifact data 341 at a periodic time basis, such as an hourly generation or other time period that provides for a frequent refresh of the model artifact data 341. Row 523 includes the characteristic of "newModelGenerateFrequency" representing how often a model will be retrained. In this example for row 523, the characteristic is set to "1h" representing that a new model will be generated if the model is older than one hour.

The data streaming module 310 streams the streaming data 312 to the model trainer module 320. The data streaming module 310 also streams the streaming data 312 to be stored at the historical streamed data database 350. The model trainer module 320 generates model artifact data 341 based on a certain volume of records that form a sequential window of records based on a time period. Such a window is considered sliding, because as time passes, a new set of sequential records are utilized for each time period. Row 524 includes the characteristic of "trainingWindowSize" representing a time frame of historical data to be used to train a model. In this example for row 524, the characteristic is set to "10d" representing ten days of historical data to be used for training.

When a model is trained by the model trainer module 320, it utilizes a first portion of the streaming data 312 to train the model and second portion of the streaming data 312 to test the model to see if was successfully trained. If it fails the test, then the model is retrained. Furthermore, such testing is used to evaluate which neural network model is most effective in predicting anomalies. Row 525 includes the characteristic of "trainingSplitFactor" representing which portion of the data is used for training and which portion of the data is used for testing. In this example for row 525, the characteristic is set to "0.8" representing that 80% of the data is used for training the model and 20% is used for testing the model's training.

The model artifact data 341 includes feature data that is applicable to determine an anomaly based on the streaming data 312. The model trainer module 320 generates model artifact data based on a definition of the feature data within the model metadata 342. Row 526 includes the characteristic of "modelFeatures" representing a list of model features in rows 527 through 530 that are graphed by a neural network model. Each of these rows has a list characteristic of "featureName" representing the name of the feature and has a list characteristic of "featureSmoothing" representing a normalization of the data as preprocessing of the features.

In this example for row 527, the first list characteristic is set to "count_2×" representing the two hundred series responses and the second list characteristic is set to ["int", "log", "sqrt"] representing smoothing based on integer, logarithm, and square root functions. In this example for row 528, the first list characteristic is set to "count_4×" representing the four hundred series responses and the second list characteristic is set to ["int", "log"] representing smoothing based on integer and logarithm functions. In this example for row 529, the first list characteristic is set to "count_5×"

representing the five hundred series responses and the second list characteristic is set to ["int", "log"] representing smoothing based on integer and logarithm functions. In this example for row 530, the first list characteristic is set to "iqr_svcTime" representing the difference in response time of the 25 percentile and the 75 percentile and the second list characteristic is set to ["int", "log"] representing smoothing based on integer and logarithm functions. It is to be understood that the model metadata illustrated in FIG. 5 defines four features to be utilized for model training and anomaly detection, but that any number of features may be included in a model metadata record.

Although not shown in FIG. 5, model metadata may include a characteristic defining where streaming data is to be received, such as from the data streaming module 310 or the historical streamed data database 350.

The model trainer module 320 utilizes model metadata, such as the model metadata illustrated in FIG. 5, to train a model. The trained model is then stored as a neural network artifact represented as model artifact data 341 in the model database 340. The model trainer module 320 binds model metadata to streaming data based on a service description such as a service alias. There is at least one neural network artifact for each service.

The model metadata 342, such as the model metadata depicted in FIG. 5, defines how streaming data 312 is to be preprocessed. For example, streaming data 312 may be preprocessed through filtering and grouping prior to being used to train a neural network model, prior to determining whether a neural network model is to be retrained, and prior to utilizing the neural network model to detect an anomaly. Filtering is selecting a portion of streaming data 312 based on a determined service. Grouping is grouping sequential data based on a time period of a window.

Model metadata objects may form a hierarchy of inheritance, such that certain portions of a parent model metadata object can be overwritten by a child model metadata object. For example, a parent model metadata object may be created for a first service. In this example, a child model metadata object may be created for a second service that is similar to the first service. In this example, the child model metadata object inherits the characteristics of the parent model metadata object. In this example, the child model metadata object may modify some of the inherited characteristics to adapt to the second service.

FIG. 6 is an example table 600 of features for anomaly detection. It is to be understood that the table 600 of FIG. 6 is for exemplary purposes and is not meant to be limiting. Referring to FIGS. 1, 2, 3, 4, 5, and 6 together, column 611 represents features of an exemplary feature vector that includes twelve rows of features. The model trainer module 320 uses one or more feature vectors, such as the feature vector illustrated in FIG. 6, to train a model based on model metadata, such as the model metadata illustrated in FIG. 5. The anomaly detector module 330 uses one or more feature vectors, such as the feature vector illustrated in FIG. 6, to detect one or more anomalies. The feature vectors are used to train a neural network model to determine normal patterns of data as represented by a threshold value and then to detect abnormal patterns of data as represented by an anomaly score.

The feature vector illustrated in FIG. 6 represents preprocessed streaming data 312, such as aggregated values of metrics for a particular service.

Row 621 includes the variable of "svcAlias" representing the alias of the service that generated the feature vector. The alias of a service defines a key of the key data 314. In this example for row 621, the variable is set to "biz.CTO.auth" representing a service that provides authentication ("auth") for the technology infrastructure ("CTO") of a business ("biz").

Row 622 includes the variable of "time" representing a time stamp of the creation of the feature vector. In this example for row 622, the variable has a value of "2018-04-23T18:53:00-07:00" representing a timestamp of the feature.

Row 623 includes the feature of "count_2x" representing a count of two hundred series responses. In this example for row 623, the feature has a value of "24393" representing a count of twenty four thousand three hundred and ninety three records for the feature. In this example, such a high value may exceed a threshold, such as one thousand records, determined by the applicable neural network model.

Row 624 includes the feature of "count_3x" representing a count of three hundred series responses. In this example for row 624, the feature has a value of "0" representing a count of zero records for the feature.

Row 625 includes the feature of "count_4x" representing a count of four hundred series responses. In this example for row 625, the feature has a value of "326" representing a count of three hundred and twenty six records for the feature.

Row 626 includes the feature of "count 401" representing a count of the 401 labeled responses. In this example for row 626, the feature has a value of "15" representing a count of fifteen records for the feature.

Row 627 includes the feature of "count 403" representing a count of the 403 labeled responses. In this example for row 627, the feature has a value of "0" representing a count of zero records for the feature.

A feature vector, such as the feature vector illustrated in FIG. 6, is represented as a one-dimensional vector. When a count of a feature of the feature vector illustrated in table 600 increases above a normal pattern, such as exceeding a threshold determined by a model, the anomaly detector module 330 may detect an anomaly.

Figure 7:
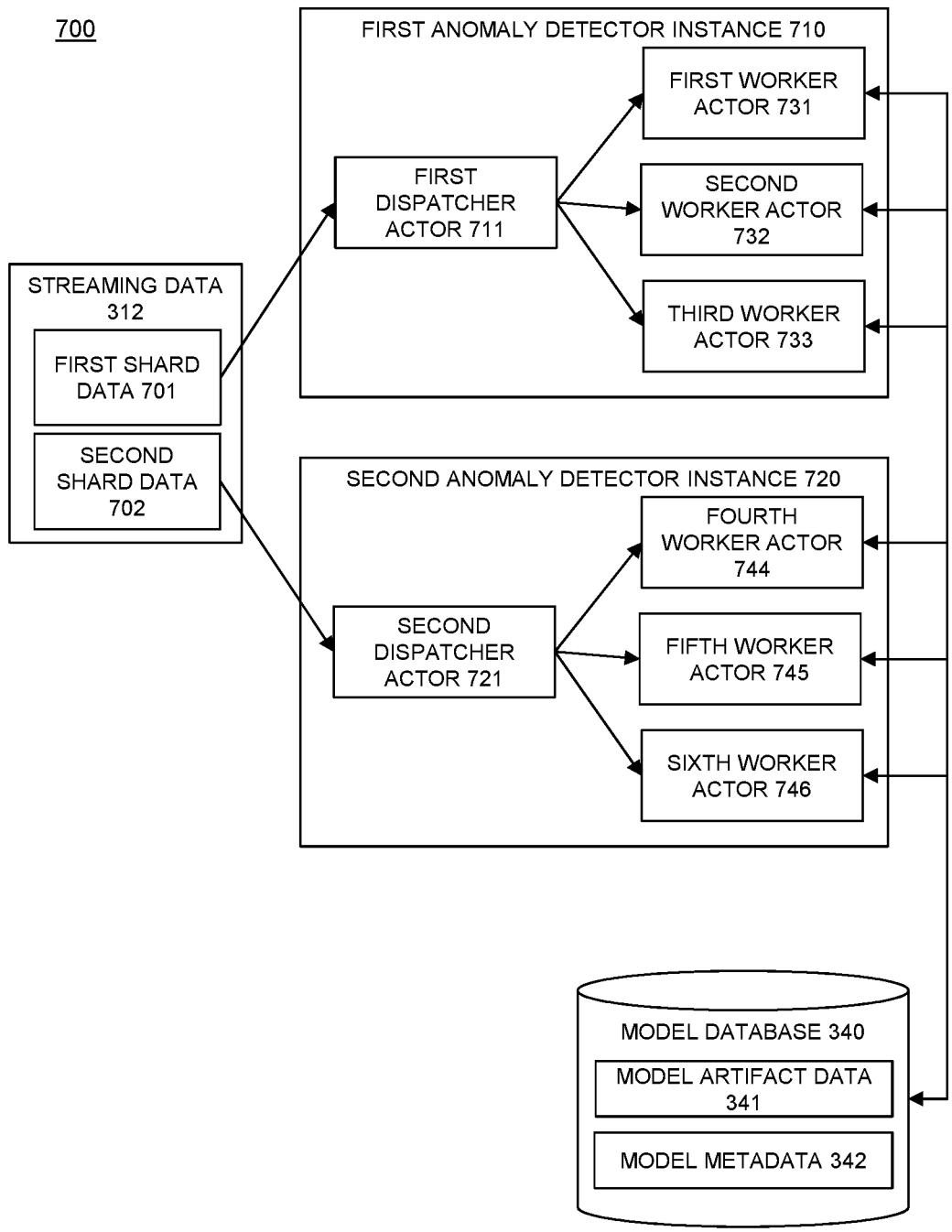
FIG. 7 is a data block diagram of a process for anomaly detection.

FIG. 7 is a data block diagram of a process 700 for anomaly detection. It is to be understood that the process 700 of FIG. 7 is for exemplary purposes and is not meant to be limiting. Referring to FIGS. 1, 2, 3, 4, 5, 6, and 7 together, the anomaly detector module 330 of FIG. 3 utilizes the process 700 illustrated in FIG. 7. The process 700 illustrates parallelism of behavior driven by model metadata 342. The process 700 illustrates how streaming data 312 is partitioned into a plurality of shards, such as the first shard data 701 and the second shard data 702. It is to be understood that while only two shards are illustrated in FIG. 7, there may be any number of shards partitioned from the streaming data 312. For example, streaming data 312 may be partitioned into one shard, three shards, ten shards, twenty shards, and any other number of shards.

Service data is aggregated by the log file module 220 and the aggregated service data is published to the data streaming module 310 by the log publisher module 230. The data streaming module 310 generates streaming data 312 to be delivered in parallel to the model trainer module 320 and the anomaly detector module 330. The data streaming module 310 specifies a key of the key data 314 that is used to distribute the shards. For example, a key may be a service alias such as "biz.CTO.oauth2" illustrated at row 621 of table 600 of FIG. 6. A hash function is applied to the key, and based on the hash, a key is associated with a shard, such as the first shard data 701. Accordingly, the data streaming records for an identical key will be associated with a single shard. The data streaming records having the same key are associated with a respective shard. The data streaming records of the streaming data 312 are distributed across a plurality of shards based on the respective keys of the data streaming records. Accordingly, streaming data 312 is partitioned into a plurality of shards, such as the first shard data 701 and the second shard data 702.

The anomaly detector module 330 receives the first shard data 701 and the second shard data 702. The first shard data 701 is bound to the first anomaly detector instance 710 of the anomaly detector module 330 and the second shard data 702 is bound to the second anomaly detector instance 720 of the anomaly detector module 330. It is to be understood that although two anomaly detector instances are illustrated in FIG. 7, there may be any number of anomaly detector instances of the anomaly detector module 330. The first anomaly detector instance 710 includes a first dispatcher actor 711 and the second anomaly detector instance 720 includes a second dispatcher actor 721. The data streaming module 310 pushes the first shard data 701 to the first dispatcher actor 711 and the data streaming module 310 pushes the second shard data 702 to the second dispatcher actor 721. The first dispatcher actor 711 is bound to the first shard data 701, such as with a registry call-back with the first shard data 701, and the second dispatcher actor 721 is bound to the second shard data 702, such as with a registry call-back with the second shard data 702. The first dispatcher actor 711 consumes the records of the first shard data 701 and the second dispatcher actor 721 consumes the records of the second shard data 702.

The first anomaly detector instance 710 includes a first worker actor 731, a second worker actor 732, and a third worker actor 733. It is to be understood that although there are three worker actors illustrated for the first anomaly detector instance 710, there may be any number of worker actors for the first anomaly detector instance 710. The first dispatcher actor 711 manages the first worker actor 731, the second worker actor 732, and the third worker actor 733. The second anomaly detector instance 720 includes a fourth worker actor 744, a fifth worker actor 745, and a sixth worker actor 746. It is to be understood that although there are three worker actors illustrated for the second anomaly detector instance 720, there may be any number of worker actors for the second anomaly detector instance 720. The second dispatcher actor 721 manages the fourth worker actor 744, the fifth worker actor 745, and the sixth worker actor 746.

After the first dispatcher actor 711 receives the first shard data 701, it distributes the first shard data 701, based on the key, to the appropriate one of the first worker actor 731, the second worker actor 732, and the third worker actor 733. The worker actor that receives the first shard data 701, such as the first worker actor 731, retrieves the applicable model artifact data 341 representing the applicable neural network model for the first shard data 701. The applicable neural network model is determined by the first worker actor 731 based on the key of the first shard data 701. For example, there may be six hundred keys corresponding to six hundred services of the API service module 212, and there may be six hundred neural network models stored as model artifact data 341 corresponding to the six hundred services of the API service module 212. The retrieved applicable neural network model is utilized to determine an anomaly from the first shard data 701. Such a determination of an anomaly is determined by calculating an anomaly score that is compared to a threshold value that is determined by the neural network model. If an anomaly is detected, then a notification is delivered to the dashboard system 140.

The data streaming module 310 delivers first shard data 701 of the streaming data 312 to the first dispatcher actor 711. The first dispatcher actor 711 selects the first worker actor 731 based on a key of the first shard data 701. It is to be understood that any of the first worker actor 731, the second worker actor 732 and the third worker actor 733 could be selected based on the key of the first shard data 701. The first dispatcher actor 711 delivers the first shard data 701 to the first worker actor 731. The first worker actor 731 determines whether the first shard data 701 contains sufficient data streaming records, such as data streaming records within a time period window.

The first worker actor 731 determines whether an applicable neural network model is cached for immediate use, such as in short-term memory, and if so, processes the first shard data 701 through the cached neural network model. The first worker actor 731 determines whether an applicable neural network model needs to be updated, and if so, updates the neural network model based on the first shard data 701 and historical data stored in the historical streamed data database 350. For example, a neural network is to be retrained if it is older than one hour. The first worker actor 731 retrieves from the model database 340 the applicable model artifact data 341 representing an applicable neural network model associated with the applicable key of the first shard data 701.

The first worker actor 731 processes the first shard data 701 as a feature vector based on the applicable model metadata 342 of the model database 340. Such a feature vector is processed through the retrieved neural network model to determine an anomaly score. An anomaly score is delivered to the analytics module 410 of the dashboard system 140. The analytics module 410 delivers the anomaly score to the dashboard module 420.

Figure 8A:
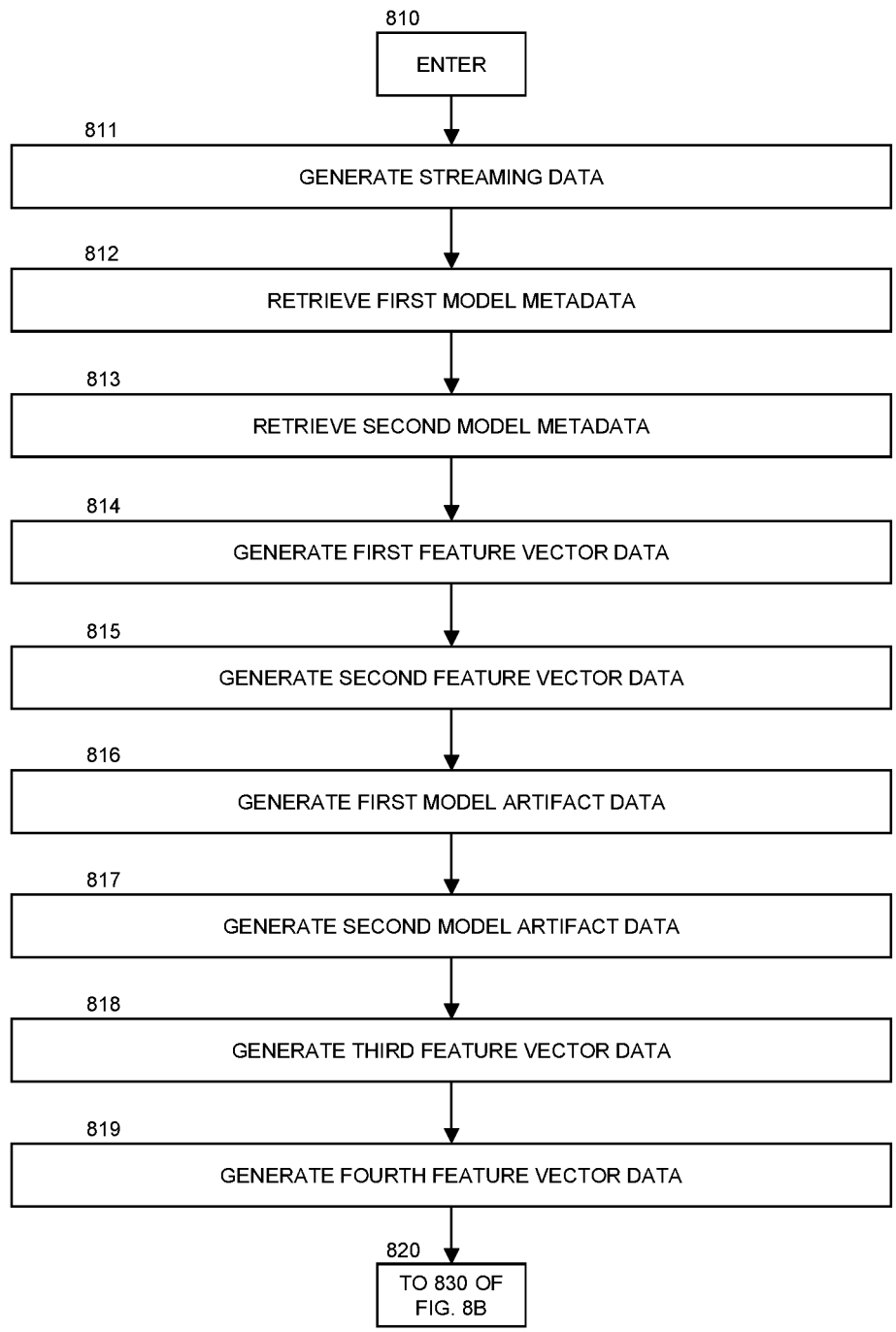
FIGS. 8A and 8B are flow diagrams of a process for anomaly detection.
Figure 8B:
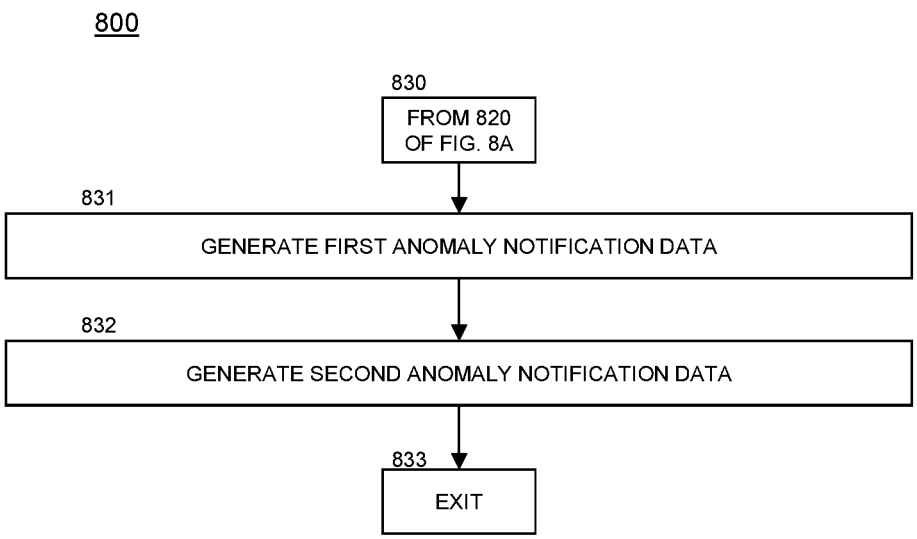

FIGS. 8A and 8B are flow diagrams of a process 800 for anomaly detection. It is to be understood that the process 800 of FIGS. 8A and 8B is for exemplary purposes and is not meant to be limiting. Referring to FIGS. 1, 2, 3, 4, 5, 6, 7, 8A, and 8B together, the process 800 for anomaly detection begins at operation 810 and process flow proceeds to operation 811.

At operation 811, streaming data 312 is generated by the data streaming module 310. The streaming data 312 represents published aggregated log entries. The streaming data 312 is based on aggregated service data received from the data management system 120. The streaming data 312 is generated from data published by the log publisher module 230. The log publisher module 230 publishes data received from the log file module 220. The log file module 220 receives and aggregates log entries from the API gateway module 210. Log entries of the API gateway module 210 are based on responses of the API service module 212 to requests from the API consumer module 208.

The data streaming module 310 streams the streaming data 312 through delivery to a plurality of modules in parallel. The data streaming module 310 delivers the streaming data 312 to the model trainer module 320. The data streaming module 310 delivers the streaming data 312 to the anomaly detector module 330. The data streaming module 310 delivers the streaming data 312 to be stored at the historical streamed data database 350.

Once the streaming data 312 is generated by the data streaming module 310 at operation 811, process flow proceeds to operation 812.

At operation 812, first model metadata 342 is retrieved by the model trainer module 320 from the model database 340 based on first key data 314 that represents a first service identifier associated with a first portion of the streaming data 312. Such a first portion of the streaming data 312 represents records of the streaming data 312 that are associated with the first key data 314. The first key data 314 represents a service of the API service module 212. The first key data 314 is associated with the first model metadata 342 stored at the model database 340.

The first model metadata 342 is configured by an engineer via the dashboard system 140. An engineer accesses the dashboard system 140 via the engineer system 403. The first model metadata 342 represents instructions for preprocessing a first portion of the streaming data 312 associated with the first key data 314, training a neural network model, and utilizing a neural network model to detect anomalies. The table 500 of FIG. 5 illustrates an example of the first model metadata 342.

Preprocessing of the first portion of the streaming data 312 defines how first feature vector data 322 is to be generated. The table 600 of FIG. 6 illustrates an example of the first feature vector data 322. The first model metadata 342 includes ensuring that the size of the first portion of the streaming data 312 is sufficiently large. The first model metadata 342 defines a window size of contiguous streamed records. The first model metadata 342 defines a range of timestamps of streaming data 312 to be included in the first feature vector data 332. The first model metadata 342 defines a minimum amount of streaming data 312 to be included in the first feature vector data 322.

The first model metadata 342 defines smoothing and normalization of the first portion of the streaming data 312. The first model metadata 342 defines the type of neural network model to be generated. The first model metadata 342 defines the neural network model architecture including neurons, layers, and regularization parameters. The first model metadata 342 defines which portion of the streaming data 312 is allocated for training a model and which portion of the streaming data 312 is allocated for testing the model.

Once the first model metadata 342 is retrieved by the model trainer module 320 at operation 812, process flow proceeds to retrieve second model metadata operation 813.

At operation 813, second model metadata 342 is retrieved by the model trainer module 320 from the model database 340 based on second key data 314 that represents a second service identifier associated with a second portion of the streaming data 312. Such a second portion of the streaming data 312 represents records of the streaming data 312 that are associated with the second key data 314. The second key data 314 represents a service of the API service module 212. The second key data 314 is associated with the second model metadata 342 stored at the model database 340.

The second model metadata 342 is configured by an engineer via the dashboard system 140. An engineer accesses the dashboard system 140 via the engineer system 403. The second model metadata 342 represents instructions for preprocessing a second portion of the streaming data 312 associated with the second key data 314, training a neural network model, and utilizing a neural network model to detect anomalies.

Preprocessing of the second portion of the streaming data 312 defines how second feature vector data 322 is to be generated. The second model metadata 342 includes ensuring that the size of the second portion of the streaming data 312 is sufficiently large. The second model metadata 342 defines a window size of contiguous streamed records. The second model metadata 342 defines a range of timestamps of streaming data 312 to be included in the second feature vector data 332. The second model metadata 342 defines a minimum amount of streaming data 312 to be included in the second feature vector data 322.

The second model metadata 342 defines smoothing and normalization of the second portion of the streaming data 312. The second model metadata 342 defines the type of neural network model to be generated. The second model metadata 342 defines the neural network model architecture including neurons, layers, and regularization parameters. The second model metadata 342 defines which portion of the streaming data 312 is allocated for training a model and which portion of the streaming data 312 is allocated for testing the model.

It is to be understood that any number of model metadata 342 may be retrieved by the model trainer module 320, such as third model metadata 342.

Once the second model metadata 342 is retrieved by the model trainer module 320 at operation 813, process flow proceeds to operation 814.

At operation 814, first feature vector data 322 is generated by the model trainer module 320 based on the first portion of the streaming data 312. The first feature vector data 322 is generated based on the associated first model metadata 342. The first feature vector data 322 is generated based on historical streamed data stored at the historical streamed data database 350. Such historical streamed data supplements the first portion of the streaming data 312, such as to provide additional historical data when the first portion of the streaming data 312 is not sufficiently large in size to provide a sufficient data sample with which to train a model. The table 600 of FIG. 6 illustrates specific illustrative first feature vector data 322. The first feature vector data 322 represents a one-dimensional vector that is utilized to train a neural network model.

Once the first feature vector data 322 is generated by the model trainer module 320 at operation 814, process flow proceeds to operation 815.

At operation 815, second feature vector data 322 is generated by the model trainer module 320 based on the second portion of the streaming data 312. The second feature vector data 322 is generated based on the associated second model metadata 342. The second feature vector data 322 is generated based on historical streamed data stored at the historical streamed data database 350. Such historical streamed data supplements the second portion of the streaming data 312, such as to provide additional historical data when the second portion of the streaming data 312 is not sufficiently large in size to provide a sufficient data sample with which to train a model. The second feature vector data 322 represents a one-dimensional vector that is utilized to train a neural network model.

It is to be understood that any number of feature vector data may be generated by the model trainer module 320, such as third feature vector data 322.

Once the second feature vector data 322 is generated by the model trainer module 320 at operation 815, process flow proceeds to generate first model artifact data operation 816.

At operation 816, first model artifact data 341 is generated by the model trainer module 320. The first model artifact data 341 represents a first neural network model that is trained by the model trainer module 320 based on the first feature vector data 322 and the first model metadata 342. The first model artifact data 341 is stored by the model trainer module 320 in the model database 340. The first model artifact data 341 is stored in the model database 340 in a compressed format and is retrieved in an uncompressed format. Such a compressed format is a serialized format and such an uncompressed format is a deserialized format.

The first model artifact data 341 is generated to replace previously generated model artifact data. Such a replacement represents a retraining of a neural network model.

Once the first model artifact data 341 is generated by the model trainer module 320 at operation 816, process flow proceeds to operation 817.

At operation 817, second model artifact data 341 is generated by the model trainer module 320. The second model artifact data 341 represents a second neural network model that is trained by the model trainer module 320 based on the second feature vector data 322 and the second model metadata 342. The second model artifact data 341 is stored by the model trainer module 320 in the model database 340. The second model artifact data 341 is stored in the model database 340 in a compressed format and is retrieved in an uncompressed format. Such a compressed format is a serialized format and such an uncompressed format is a deserialized format.

The second model artifact data 341 is generated to replace previously generated model artifact data. Such a replacement represents a retraining of a neural network model.

It is to be understood that any number of model artifact data 341 may be generated by the model trainer module 320, such as third model artifact data 341.

Once the second model artifact data 341 is generated by the model trainer module 320 at operation 817, process flow proceeds to operation 818.

At operation 818, third feature vector data 332 is generated by the anomaly detector module 330. The anomaly detector module 330 receives the first portion of the streaming data 312 that is associated with the first key data 314. The anomaly detector module 330 retrieves the first model metadata 342 associated with the first key data 314. The anomaly detector module 330 retrieves the first model metadata 342 from the model database 340. The anomaly detector module 330 generates the third feature vector data 332 based on the first model metadata 342 and the first portion of the streaming data 312.

The third feature vector data 332 is identical to the first feature vector data 322, such as when the model trainer module 320 generates the first feature vector data 322 based on the first portion of the streaming data 312. The third feature vector data 332 is different from the first feature vector data 322, such as when the model trainer module 320 generates the first feature vector data 322 based on the first portion of the streaming data 312 and historical streamed data of the historical streamed data database 350.

The third feature vector data 332 is generated based on first shard data 701. The first shard data 701 is generated by the data streaming module 310 based on a first portion of the streaming data 312. A first dispatcher actor 711 of the anomaly detector module 330 receives the first shard data 701. The first shard data 701 includes first key data 314. The first dispatcher actor 711 generates a first hashed key based on the first key data 314. The first dispatcher actor 711 delivers the first shard data 701 and the first hashed key to a first worker actor 731 of the anomaly detector module 330. The first worker actor 731 selects the first model artifact data 341 based on the first hashed key.

Once the third feature vector data 332 is generated by the anomaly detector module 330 at operation 818, process flow proceeds to operation 819.

At operation 819, fourth feature vector data 332 is generated by the anomaly detector module 330. The anomaly detector module 330 receives the second portion of the streaming data 312 that is associated with the second key data 314. The anomaly detector module 330 retrieves the second model metadata 342 associated with the second key data 314. The anomaly detector module 330 retrieves the second model metadata 342 from the model database 340. The anomaly detector module 330 generates the fourth feature vector data 332 based on the second model metadata 342 and the second portion of the streaming data 312.

The fourth feature vector data 332 is identical to the second feature vector data 322, such as when the model trainer module 320 generates the second feature vector data 322 based on the second portion of the streaming data 312. The fourth feature vector data 332 is different from the second feature vector data 322, such as when the model trainer module 320 generates the second feature vector data 322 based on the second portion of the streaming data 312 and historical streamed data of the historical streamed data database 350.

The fourth feature vector data 332 is generated based on second shard data 702. The second shard data 702 is generated by the data streaming module 310 based on a second portion of the streaming data 312. A second dispatcher actor 721 of the anomaly detector module 330 receives the second shard data 702. The second shard data 702 includes second key data 314. The second dispatcher actor 721 generates a second hashed key based on the second key data 314. The second dispatcher actor 721 delivers the second shard data 702 and the second hashed key to a second worker actor 744 of the anomaly detector module 330. The second worker actor 744 selects the second model artifact data 341 based on the second hashed key.

It is to be understood that any number of feature vector data 332 can be generated by the anomaly detector module 330, such as fifth feature vector data 332.

Once the fourth feature vector data 332 is generated by the anomaly detector module 330 at operation 819, process flow proceeds to operation 820 of FIG. 8A and operation 830 of FIG. 8B and then to operation 831.

At operation 831, first anomaly notification data 334 is generated by the anomaly detector module 330. The first anomaly notification data 334 represents a first notification of a first anomaly detected based on the first model artifact data 341, the third feature vector data 332, and the first model metadata 342. The first anomaly is detected based on an anomalous pattern of the first portion of the streaming data 312. The first anomaly is detected based on a first anomaly score exceeding a first threshold value. The anomaly detector module 330 retrieves the first model artifact data 341 based on the first model metadata 342. The first model artifact data 341 is retrieved in an uncompressed format. The first model artifact data 341 is retrieved in a deserialized format.

The first anomaly notification data 334 is delivered to the analytics module 410 of the dashboard system 140. The analytics module 410 provides the first anomaly notification data 334 to an engineer via the dashboard module 420. An engineer receives the first anomaly notification data 334 via the engineer system 403.

Once the first anomaly notification data 334 is generated by the anomaly detector module 330 at operation 831, process flow proceeds to operation 832.

At operation 832, second anomaly notification data 334 is generated by the anomaly detector module 330. The second anomaly notification data 334 represents a second notification of a second anomaly detected based on the second model artifact data 341, the fourth feature vector data 332, and the second model metadata 342. The second anomaly is detected based on an anomalous pattern of the second portion of the streaming data 312. The second anomaly is detected based on a second anomaly score exceeding a second threshold value. The anomaly detector module 330 retrieves the second model artifact data 341 based on the second model metadata 342. The second model artifact data 341 is retrieved in an uncompressed format. The second model artifact data 341 is retrieved in a deserialized format.

The second anomaly notification data 334 is delivered to the analytics module 410 of the dashboard system 140. The analytics module 410 provides the second anomaly notification data 334 to an engineer via the dashboard module 420. An engineer receives the second anomaly notification data 334 via the engineer system 403.

It is to be understood that any number of anomaly notification data 334 can be generated by the anomaly detector module 330, such as third anomaly notification data 334.

Once the second anomaly notification data 334 is generated by the anomaly detector module 330 at operation 832, process flow proceeds to operation 833.

At operation 833, the process 800 for anomaly detection is exited.

Embodiments of the present disclosure provide highly efficient, effective, and versatile systems and methods for anomaly detection. However, the disclosed embodiments do not encompass, embody, or preclude other forms of innovation in the area of anomaly detection systems and methods.

In addition, the disclosed embodiments of systems and methods for anomaly detection are not abstract ideas for at least several reasons.

First, the disclosed systems and methods for anomaly detection are not abstract ideas because they are not merely an idea itself (e.g., mental processes that can be performed mentally or using pen and paper). For example, it is not possible for the human mind to comprehend all of the normal patterns of historical streamed data. Furthermore, it is not possible for the human mind to detect an abnormal pattern within the data being streamed in relative real-time based on a comparison of the abnormal pattern to all of the normal patterns of previously streamed data. In contrast, the disclosed embodiments utilize a plurality of neural network models to determine normal patterns of historical streamed data and also to determine anomalous patterns of data streamed in relative real-time. Furthermore, such a plurality of neural network models is continuously updated and improved with the addition of new data streamed in relative real-time. Due to the complexity of the variability of the streaming data, a human mind cannot determine normal patterns and detect abnormal patterns in the data even with the aid of pen and paper.

Second, the disclosed systems and methods for anomaly detection are not abstract ideas because they are not a method of organizing human activity such as fundamental economic principles or practices (including hedging, insurance, mitigating risk); commercial or legal interactions (including agreements in the form of contracts; legal obligations; advertising, marketing or sales activities or behaviors; business relations); and managing personal behavior or relationships or interactions between people (including social activities, teaching, and following rules or instructions). In contrast, the disclosed embodiments provide for anomaly detection of data streamed in relative real-time. For example, API gateways receive messages from API services that are indicative of normal patterns of messages and anomalous patterns of messages. Such determination of normal patterns of messages and anomalous patterns of messages is not organizing human activity.

Third, although mathematics may be used in the disclosed systems and methods for anomaly detection, the disclosed and claimed systems and methods are not abstract ideas because they are not simply a mathematical relationship/formula. In contrast, utilization of the disclosed embodiments results in the tangible effect of reduced use of processor workloads, memory, bandwidth, and power consumption associated with the utilization of a plurality of neural network models is trained and retrained in parallel manner. In contrast, with a traditional data management system, a single deep neural network is inefficiently retrained with the receipt of streaming data. Consequently, computing and communication systems implementing or providing the embodiments of the present disclosure are transformed into more operationally efficient devices and systems, resulting in reduced system resources and costs.

In addition, the disclosed systems and methods describe a practical application to improve the art of anomaly detection by providing a technical solution to the technical problem of detecting anomalous patterns in data produced by data management systems.

In the discussion above, certain aspects of some embodiments include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below. Therefore, numerous variations, whether explicitly provided for by the specification or implied by the specification or not, may be implemented by one of skill in the art in view of this disclosure.

What is claimed is:

1. A computing system implemented method comprising: generating a plurality of data streams based on a plurality of aggregated service metrics; retrieving a plurality of metadata configurations, each metadata configuration of the plurality of metadata configurations associated with a respective data stream of the plurality of data streams; training in parallel a plurality of neural network models based on the plurality of data streams and the plurality of metadata configurations; and determining in parallel a plurality of notifications representing anomaly detections based on the plurality of neural network models and the plurality of data streams.

2. The computing system implemented method of claim 1, wherein the plurality of notifications is based on a plurality of threshold values respectively determined by the plurality of neural network models and wherein the plurality of notifications is further based on a plurality of anomaly scores respectively determined by the plurality of neural network models and the plurality of threshold values.

3. The computing system implemented method of claim 1, wherein the plurality of aggregated service metrics is received from an API gateway exposing over five hundred API services, and wherein the plurality of neural network models comprises over five hundred neural network models.

4. A computing system implemented method comprising: generating streaming data based on received aggregated service data comprising a first portion of the streaming data associated with first key data representing a first key of the streaming data and comprising a second portion of the streaming data associated with second key data representing a second key of the streaming data; retrieving first model metadata associated with the first key data; retrieving second model metadata associated with the second key data; generating first feature vector data based on the first portion of the streaming data associated with the first key data and the first model metadata; generating second feature vector data based on the second portion of the streaming data associated with the second key data and the second model metadata; generating first model artifact data representing a first neural network model trained with the first feature vector data and the first model metadata; generating second model artifact data representing a second neural network model trained with the second feature vector data and the second model metadata; generating third feature vector data based on the first portion of the streaming data and the first model metadata; generating fourth feature vector data based on the second portion of the streaming data and the second model metadata; generating first anomaly notification data representing a first notification of a first anomaly detected based on the first model artifact data, the third feature vector data, and the first model metadata; and generating second anomaly notification data representing a second notification of a second anomaly detected based on the second model artifact data, the fourth feature vector data, and the second model metadata.

5. The computing system implemented method of claim 4, further comprising: determining a first threshold value based on the first feature vector data and the first model artifact data; determining a second threshold value based on the second feature vector data and the second model artifact data; determining a first anomaly score value based on the third feature vector data, the first model artifact data, and the first threshold value; and determining a second anomaly score value based on the fourth feature vector data, the second model artifact data, and the second threshold value.

6. The computing system implemented method of claim 4, wherein the first model artifact data replaces third model artifact data representing a third neural network model based on a determination that the third neural network model is obsolete based on the first model metadata, and wherein the second model artifact data replaces fourth model artifact data representing a fourth neural network model based on a determination that the fourth neural network model is obsolete based on the second model metadata.

7. The computing system implemented method of claim 4, wherein the aggregated service data represents published aggregated metrics from an API gateway, the first key represents a first API service, and the second key represents a second API service.

8. The computing system implemented method of claim 4, wherein generating the third feature vector data is further based on first shard data generated based on the first portion of the streaming data and a first hashed key generated based on the first key data, and wherein generating the fourth feature vector data is further based on second shard data generated based on the second portion of the streaming data and a second hashed key generated based on the second key data.

9. The computing system implemented method of claim 8, wherein the first hashed key is generated by a first dispatcher actor, the second hashed key is generated by a second dispatcher actor, the third feature vector data is further generated by a first worker actor, and the fourth feature vector data is further generated by a second worker actor.

10. The computing system implemented method of claim 4, wherein the first neural network model is further trained with a first portion of historical streamed data and the second neural network model is further trained with a second portion of the historical streamed data.

11. The computing system implemented method of claim 4, further comprising: after generating the first model artifact data, storing the first model artifact data; after generating the second model artifact data, storing the second model artifact data; before generating the first anomaly notification data, retrieving the first model artifact data; and before generating the second anomaly notification data, retrieving the second model artifact data.

12. The computing system implemented method of claim 4, further comprising: retrieving third model metadata associated with third key data representing a third key of the streaming data; generating fifth feature vector data based on a third portion of the streaming data associated with the third key data and the third model metadata; generating third model artifact data representing a third neural network model trained with the fifth feature vector data and the third model metadata; generating sixth feature vector data based on the third portion of the streaming data and the third model metadata; and generating third anomaly notification data representing a third notification of a third anomaly detected based on the third model artifact data, the sixth feature vector data, and the third model metadata.

13. A system comprising: at least one processor; and at least one memory coupled to the at least one processor, the at least one memory having stored therein instructions which when executed by any set of the at least one processor, perform a process, the process including: generating streaming data based on received aggregated service data comprising a first portion of the streaming data associated with first key data representing a first key of the streaming data and comprising a second portion of the streaming data associated with second key data representing a second key of the streaming data; retrieving first model metadata associated with the first key data; retrieving second model metadata associated with the second key data; generating first feature vector data based on the first portion of the streaming data associated with the first key data and the first model metadata; generating second feature vector data based on the second portion of the streaming data associated with the second key data and the second model metadata; generating first model artifact data representing a first neural network model trained with the first feature vector data and the first model metadata; generating second model artifact data representing a second neural network model trained with the second feature vector data and the second model metadata; generating third feature vector data based on the first portion of the streaming data and the first model metadata; generating fourth feature vector data based on the second portion of the streaming data and the second model metadata; generating first anomaly notification data representing a first notification of a first anomaly detected based on the first model artifact data, the third feature vector data, and the first model metadata; and generating second anomaly notification data representing a second notification of a second anomaly detected based on the second model artifact data, the fourth feature vector data, and the second model metadata.

14. The system of claim 13, further comprising: determining a first threshold value based on the first feature vector data and the first model artifact data; determining a second threshold value based on the second feature vector data and the second model artifact data; determining a first anomaly score value based on the third feature vector data, the first model artifact data, and the first threshold value; and determining a second anomaly score value based on the fourth feature vector data, the second model artifact data, and the second threshold value.

15. The system of claim 13, wherein the first model artifact data replaces third model artifact data representing a third neural network model based on a determination that the third neural network model is obsolete based on the first model metadata, and wherein the second model artifact data replaces fourth model artifact data representing a fourth neural network model based on a determination that the fourth neural network model is obsolete based on the second model metadata.

16. The system of claim 13, wherein the aggregated service data represents published aggregated metrics from an API gateway, the first key represents a first API service, and the second key represents a second API service.

17. The system of claim 13, wherein generating the third feature vector data is further based on first shard data generated based on the first portion of the streaming data and a first hashed key generated based on the first key data, and wherein generating the fourth feature vector data is further based on second shard data generated based on the second portion of the streaming data and a second hashed key generated based on the second key data.

18. The system of claim 17, wherein the first hashed key is generated by a first dispatcher actor, the second hashed key is generated by a second dispatcher actor, the third feature vector data is further generated by a first worker actor, and the fourth feature vector data is further generated by a second worker actor.

19. The system of claim 13, wherein the first neural network model is further trained with a first portion of historical streamed data and the second neural network model is further trained with a second portion of the historical streamed data.

20. The system of claim 13, further comprising: after generating the first model artifact data, storing the first model artifact data; after generating the second model artifact data, storing the second model artifact data; before generating the first anomaly notification data, retrieving the first model artifact data; and before generating the second anomaly notification data, retrieving the second model artifact data.

* * * * *